US012756049B2

(12) United States Patent

Zhu et al.

(10) Patent No.: US 12,756,049 B2

(45) Date of Patent: Oct. 6, 2026

(54) PRESSURE CONTROL OF BATTERY CELLS

(71) Applicant: GM Global Technology Operations LLC, Detroit, MI (US)

(72) Inventors: Yongjie Zhu, Troy, MI (US); Chunhao J. Lee, Troy, MI (US); Jun-mo Kang, Ann Arbor, MI (US); Insu Chang, Troy, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 626 days.

(21) Appl. No.: 18/453,432

(22) Filed: Aug. 22, 2023

(65) Prior Publication Data

US 2025/0070351 A1 Feb. 27, 2025

(51) Int. Cl.

| | |
|---|---|
| ***H01M 50/242*** | (2021.01) |
| ***B60R 16/033*** | (2006.01) |
| ***H01M 10/04*** | (2006.01) |
| ***H01M 50/202*** | (2021.01) |
| ***H01M 50/211*** | (2021.01) |
| ***H01M 50/249*** | (2021.01) |

(52) U.S. Cl.

CPC ......... *H01M 50/242* (2021.01); *B60R 16/033* (2013.01); *H01M 10/0481* (2013.01); *H01M 50/202* (2021.01); *H01M 50/211* (2021.01); *H01M 50/249* (2021.01); *H01M 2200/20* (2013.01); *H01M 2220/20* (2013.01)

(58) Field of Classification Search

None

See application file for complete search history.

(56) References Cited

U.S. PATENT DOCUMENTS

| | | | |
|---|---|---|---|
| 10,355,319 | B1 | 7/2019 | Lim et al. |
| 10,446,894 | B2 | 10/2019 | Paramasivam et al. |
| 2022/0271326 | A1 | 8/2022 | Kaufmann et al. |
| 2022/0367903 | A1 | 11/2022 | Rothenburger et al. |

FOREIGN PATENT DOCUMENTS

CN 115133202 A * 9/2022 ........ H01M 10/6563

OTHER PUBLICATIONS

Wen, CN 115133202 A, English Translation from FIT (Year: 2022).*

German Office Action for German Application No. 102023128173.9; dated Jun. 14, 2024; 8 pages.

* cited by examiner

*Primary Examiner* — Colin W. Slifka

(74) *Attorney, Agent, or Firm* — CANTOR COLBURN LLP

(57) ABSTRACT

A pressure management system includes a pressure plate disposed at an initial position relative to a battery cell, the battery cell disposed in a housing, the pressure plate and the housing defining an enclosure, where an increase in an internal pressure of the battery cell causes an expansion force to be applied to the pressure plate. The system includes a mechanical linkage attached to the pressure plate, the mechanical linkage configured to translate the expansion force to a reverse force that is opposed to the expansion force, and a rotatable component connected to the mechanical linkage, the rotatable component configured to rotate from a first orientation to a second orientation based on lateral movement of the mechanical linkage to allow the pressure plate to move and increase a volume of the enclosure.

20 Claims, 8 Drawing Sheets

PRESSURE CONTROL OF BATTERY CELLS

INTRODUCTION

The subject disclosure relates to battery systems, and more particularly to managing pressure of battery cells of a battery system.

Battery pouch cells are used in various applications, such as automotive applications (e.g., in electric and hybrid vehicles). For example, electric and hybrid vehicles include battery systems that include battery packs that house multiple battery cells, which may include pouch type cells such as lithium-ion cells. As such cells charge and discharge, and as such cells age, the pressure can change, which can be detrimental to the charging and power storage capability. It is desirable to provide mechanisms that maintain battery cells at a substantially constant pressure over their operating lifetimes.

SUMMARY

In one exemplary embodiment, a pressure management system includes a pressure plate disposed at an initial position relative to a battery cell, the battery cell disposed in a housing, the pressure plate and the housing defining an enclosure, where an increase in an internal pressure of the battery cell causes an expansion force to be applied to the pressure plate. The system includes a mechanical linkage attached to the pressure plate, the mechanical linkage configured to translate the expansion force to a reverse force that is opposed to the expansion force, and a rotatable component connected to the mechanical linkage, the rotatable component configured to rotate from a first orientation to a second orientation based on lateral movement of the mechanical linkage to allow the pressure plate to move and increase a volume of the enclosure.

In addition to one or more of the features described herein, the mechanical linkage is configured to move laterally and rotate the rotatable component based on the expansion force being greater than a threshold force.

In addition to one or more of the features described herein, the rotatable component is a cam connected via a pivot point to an end of the mechanical linkage, the cam having a shape selected to allow the pressure plate to define a first distance when the cam is in the first orientation, and define a second distance when the cam is in the second orientation.

In addition to one or more of the features described herein, the cam has an eccentric center of gravity selected so that the cam is configured to return to the first orientation when the expansion force is less than the threshold force.

In addition to one or more of the features described herein, the cam is configured to maintain contact with the pressure plate during rotation to apply the reverse force continuously as the battery cell expands.

In addition to one or more of the features described herein, the mechanical linkage includes a pivot member having a first end and a second end, the first end attached to the pressure plate at a fixed pivot point, the fixed pivot point having a fixed position relative to the pressure plate.

In addition to one or more of the features described herein, the mechanical linkage includes a linking member having a third end and a fourth end, the third end connected to the second end by a second pivot point, the fourth end connected to the rotatable component.

In addition to one or more of the features described herein, the pivot member includes a third pivot point between the first end and the second end, the third pivot point configured to move laterally along a guide member.

In addition to one or more of the features described herein, the guide member includes a track that causes the third pivot point to move within a lateral path and cause the fourth end to move both laterally and toward the pressure plate, such that the rotatable component applies the reverse force during rotation of the rotatable component.

In another exemplary embodiment, a method of controlling a pressure of a battery cell includes receiving an expansion force at a pressure plate disposed at an initial position relative to the battery cell, the battery cell disposed in a housing, the pressure plate and the housing defining an enclosure, the expansion force resulting from an increase in an internal pressure of the battery cell. The method includes managing a pressure of the battery cell by a pressure management system including a mechanical linkage attached to the pressure plate, the mechanical linkage connected to a rotatable component, wherein managing the pressure includes, translating the expansion force to a reverse force based on lateral movement of the mechanical linkage, the reverse force configured to oppose the expansion force, and based on the expansion force exceeding a threshold force, causing the mechanical linkage to move laterally and rotate the rotatable component from a first orientation to a second orientation to allow the pressure plate to move and increase a volume of the enclosure.

In addition to one or more of the features described herein, the rotatable component is a cam connected via a pivot point to an end of the mechanical linkage, the cam having a shape selected to allow the pressure plate to define a first distance when the cam is in the first orientation, and define a second distance when the cam is in the second orientation.

In addition to one or more of the features described herein, the cam has an eccentric center of gravity selected so that the cam is configured to return to the first orientation when the expansion force is less than the threshold force.

In addition to one or more of the features described herein, the cam maintains contact with the pressure plate during rotation to apply the reverse force continuously as the battery cell expands.

In addition to one or more of the features described herein, the mechanical linkage includes a pivot member having a first end and a second end, the first end attached to the pressure plate at a fixed pivot point, the fixed pivot point having a fixed position relative to the pressure plate, and the mechanical linkage includes a linking member having a third end and a fourth end, the third end connected to the second end by a second pivot point, the fourth end connected to the rotatable component.

In addition to one or more of the features described herein, the pivot member includes a third pivot point between the first end and the second end, the third pivot point configured to move laterally along a guide member.

In addition to one or more of the features described herein, the guide member includes a track that causes the third pivot point to move within a lateral path and cause the fourth end to move both laterally and toward the pressure plate, such that the rotatable component applies the reverse force during rotation.

In yet another exemplary embodiment, a vehicle system includes a battery system connected to an electric motor of a vehicle, the battery system including a battery cell disposed in a housing. The vehicle system also includes a pressure management system having a pressure plate disposed at an initial position relative to a battery cell, the battery cell disposed in a housing, the pressure plate and the housing defining an enclosure, where an increase in an internal pressure of the battery cell causes an expansion force to be applied to the pressure plate. The pressure management system includes a mechanical linkage attached to the pressure plate, the mechanical linkage configured to translate the expansion force to a reverse force that is opposed to the expansion force, and a rotatable component connected to the mechanical linkage, the rotatable component configured to rotate from a first orientation to a second orientation based on lateral movement of the mechanical linkage to allow the pressure plate to move and increase a volume of the enclosure.

In addition to one or more of the features described herein, the mechanical linkage is configured to move laterally and rotate the rotatable component based on the expansion force being greater than a threshold force.

In addition to one or more of the features described herein, the rotatable component is a cam connected via a pivot point to an end of the mechanical linkage, the cam having a shape selected to allow the pressure plate to define a first distance when the cam is in the first orientation, and define a second distance when the cam is in the second orientation, and wherein the cam is configured to maintain contact with the pressure plate during rotation to apply the reverse force continuously as the battery cell expands.

In addition to one or more of the features described herein, the cam has an eccentric center of gravity selected so that the cam is configured to return to the first orientation when the expansion force is less than the threshold force.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
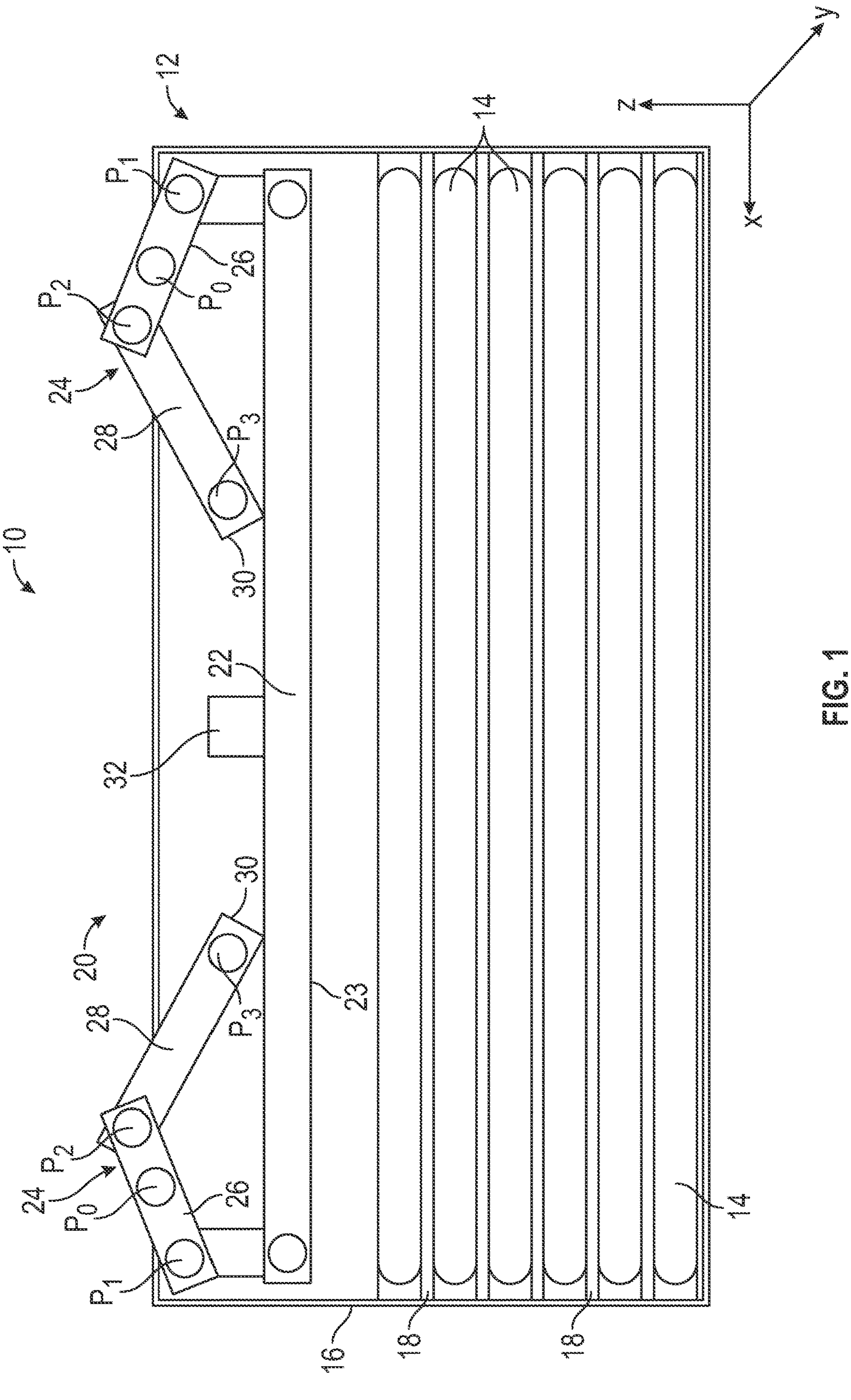
FIG. 1 depicts an energy storage system including a housing that holds one or more battery cells, and a pressure management system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, methods, devices and systems are provided for controlling pressure in battery assemblies and battery systems. An embodiment of a pressure management system includes a pressure plate disposed in a housing of a battery assembly (e.g., a battery pack or battery module), and moveable in response to an expansion force generated by expansion of a battery cell or cells in the housing. The pressure management system also includes one or more mechanical linkages that translate a portion of the expansion force into a reactive force or reverse force, to maintain or achieve a desired pressure in the battery cell(s).

In an embodiment, a mechanical linkage includes a first elongated member (referred to as a "pivot member") and a second elongated member (referred to as a "linking member"). The pivot member is attached, for example, at one end by a pivot to the pressure plate, and is attached at another end to an end of the linking member by another pivot. The pivot member is also attached to a pivot point at a location between the ends of the pivot member. The pivot point may be coupled to the housing via a fixed attachment, or coupled to a track that allows for lateral movement of the pivot point. When an expansion force is applied to the pressure plate, movement of the pressure plate causes an end of the linking member to move laterally (i.e., along the pressure plate and/or in a direction orthogonal to the expansion force direction).

Lateral movement of the linking member may be restricted by limiting the lateral movement to be within a selected lateral distance. Restriction of lateral movement may be achieved by a stationary stop component attached to the pressure plate, or a component attached to the linking member.

When lateral movement is restricted, lateral force applied by the linking member is translated to a reactive force or reverse force that is proportional to the expansion force. Embodiments of the pressure management may be configured to provide a reverse force that is directly proportional to the expansion force. The proportion of the expansion force that is translated to the reverse force may be selected by selecting parameters of a linking mechanism, such as lengths of the pivot member and the linking member.

In an embodiment, lateral movement is restricted by a rotatable component, which is activated by lateral movement to rotate along the pressure plate. Rotation of the rotatable component allows a distance between the pressure plate and the housing to reduce, thereby allowing the pressure plate to move upward and provide space for expansion of a battery cell. For example, each linking member is coupled to a cam that rests on the pressure plate and establishes an initial distance when the linking mechanism is in an initial state. When a sufficient expansion force (threshold expansion force) is applied, the linking member moves laterally, causing the cam to rotate and reduce the distance between the pressure plate and the housing.

In an embodiment, the pressure management system includes a biasing system that cooperates with the mechanical linkage(s) and rotatable components to establish a desired threshold expansion force. The biasing system includes at least one biasing member that is selectable to control the amount of lateral force that must be exerted to cause a cam to rotate, and thereby calibrate the pressure management system to a desired threshold expansion force (threshold force).

For example, the biasing system includes a laterally extending spring that is configured to couple with a cam of a mechanical linkage, which allows for control of the threshold force. The spring is operably connected to the cam or the linking member and applies a spring force that opposes lateral movement of the linking member. The magnitude of the spring force can be calibrated or adjusted, for example, by selecting a spring having an appropriate spring constant and/or by incorporating a spring adjuster that can be actuated to modify the spring force.

Embodiments described herein present numerous advantages and technical effects. The embodiments provide for an improved battery functionality by maintaining a constant force on battery cells over their lifetime, and thereby effectively controlling pressure and avoiding negative effects such as dendrite growth. Furthermore, embodiments provide a mechanism that automatically adjusts to allow expansion and reduce excessive pressure that may occur due to expansion.

FIG. 1 depicts an embodiment of an energy storage device or system 10, which includes a battery module 12 that houses a set (i.e., one or more) of battery cells 14. Each battery cell 14 may be any type of cell that is rechargeable, such as a lithium-based cell (e.g., lithium-ion, lithium metal (LMB), etc.). For example, each cell 14 is a pouch-type lithium-ion cell.

The module 12 includes a housing 16 in which one or more battery cells 14 are disposed. If multiple cells are housed, they may be stacked as shown, in which adjacent cells 14 are separated by a support plate 18. It is noted that embodiments described herein are not limited to the type or dimensions of the housing 16, the type, dimensions or number of cells shown, or the type of cells shown.

The battery module 12 includes or is coupled to a pressure management system 20 configured to provide automatic management of pressure in the cells 14. The pressure management system 20 includes a pressure plate 22 disposed above the cells 14. The pressure plate 22 has a default position, which may be at or near a surface of the uppermost cell 14, such as a position in which the pressure plate 22 contacts a cell 14 (e.g., rests on the uppermost cell 14). Alternatively, as shown in FIG. 1, the default position may define a separation or gap that allows for some amount of cell expansion before pressure compensation or management is triggered. It is noted that the pressure plate 22 can be disposed at any position or location (e.g., below the battery cells 14) such that expansion of the battery cells cause movement of the pressure plate 22.

A pressure compensation device is disposed on or otherwise connected to the pressure plate 22, and is configured to apply a reactive force on the pressure plate 22 to compensate for expansion of the cells 14 and maintain the cells 14 at a desired pressure (or within a desired pressure range).

The pressure compensation device includes a set (i.e., one or more) of mechanical linkages 24 that translate an expansion force on the pressure plate 22 to a reverse force (i.e., in a direction that opposes the expansion force). For example, as the cells 14 expand and exert the expansion force in an upward direction on the pressure plate 22, the mechanical linkages 24 operate to exert a proportional downward force. Each linkage 24 can be calibrated to provide a downward force that maintains a constant selected pressure on the cells 14 as they expand.

As shown in FIG. 1, the pressure compensation device includes two linkages 24 at opposing ends of the pressure plate 22. The pressure plate 22 is oriented so that a surface 23 facing the cells 14 defines a plane that is orthogonal to a direction of expansion. For example, the direction of expansion is along a z-axis (i.e., in a z-direction), and the surface 23 is parallel to a plane defined by an x-axis and a y-axis (x-y plane).

Each mechanical linkage 24 includes a first member 26 ("pivot member") that is attached to the pressure plate 22 via a pivot pint P1. One end of the pivot member 26 is connected to the pivot point P1, and the pivot point P1 has a fixed position relative to the pressure plate 22. Another end of the pivot member 26 is attached to an end of a linking member 28 at a pivot point P2.

The pivot member 26 also includes a pivot point P0 located between the ends (e.g., at a central location equidistant from the ends of the pivot member 26. The pivot member 26 rotates about the pivot point P0 as the linking mechanism moves laterally.

When a battery cell internal pressure increases, a force due to expansion (referred to as an "expansion force" denoted by $F_e$) may be exerted on the pressure plate 22 in an upward or vertical direction (the z-direction). An end 30 of the linking member 28 is coupled to the pressure plate 22, such that the mechanical linkage 24 translates a portion of the expansion force to a reactive force (also referred to as a "reverse force" denoted $F_r$). The reverse force $F_r$ is exerted in a direction that opposes the expansion force $F_e$, and is a selected proportion of the expansion force.

If the expansion force $F_e$ is sufficient to move the pressure plate 22, the pivot member 26 rotates about the pivot point P0, which in turn causes the end 30 of the linking member 28 to move laterally (e.g., in the x-direction) or apply a lateral force toward a center of the pressure plate 22. A "lateral" direction may be a direction (e.g., in the x-y plane) orthogonal to a direction of the expansion force or a direction along a surface of the pressure plate 22.

Lateral movement is restricted so that lateral force applied by the linkage 24 is redirected toward the battery cells 14. This may be accomplished, for example, by a stop component 32, which may be a raised structure that counteracts lateral movement of the linking members 28. When a linking member 28 engages the stop component 32 or other restriction, the counteracting lateral forces cause the reverse force $F_r$ to be applied to the cell 14. The reverse force $F_r$ is proportional to the expansion force $F_e$. Parameters of the mechanical linkages 24 may be selected to calibrate the mechanical linkages 24 to achieve a desired proportionality of the reverse force. Examples of such parameters include the lengths of the pivot member 26 and the linking member 28, a height of the pivot point P1, a location of the pivot point P2, a location of the stop component 32 and others.

Lateral movement may be restricted in various ways. For example, lateral movement is restricted by a rotatable component as described further herein. Additionally, or alternatively, a biasing system may be included to adjust or calibrate the pressure management system 20.

Figure 2A:
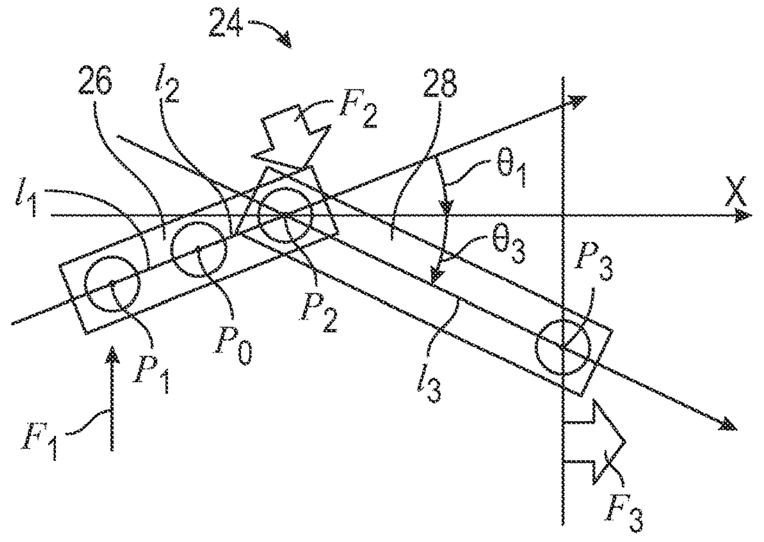
FIGS. 2A-2C are force diagrams depicting various forces generated during operation by a linking mechanism in cooperation with the biasing system of FIG. 1, in accordance with an exemplary embodiment.
Figure 2B:
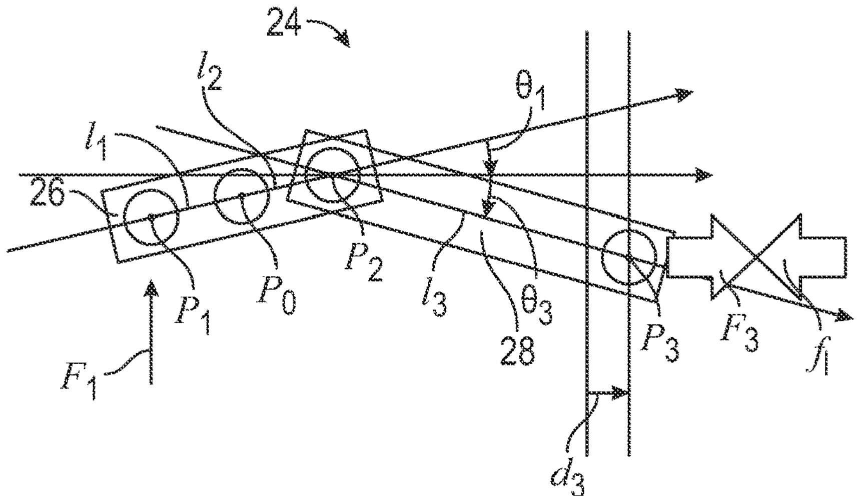
Figure 2C:
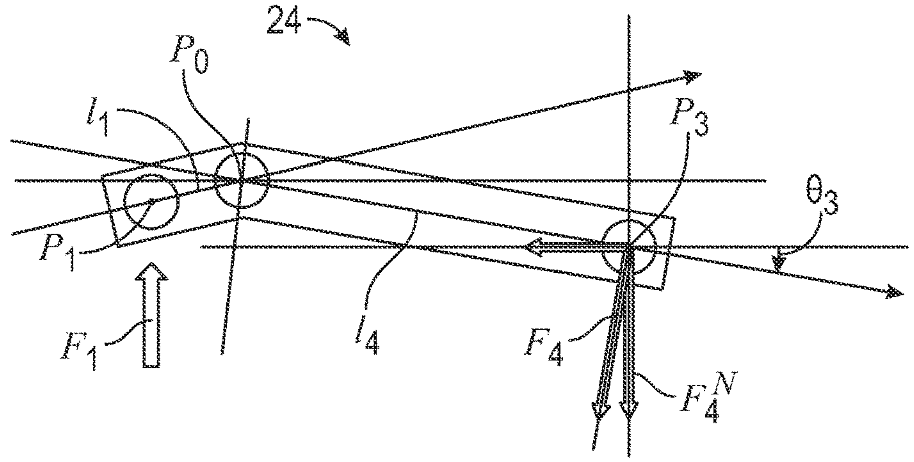

FIGS. 2A-2C are force diagrams depicting aspects of force transfer using a mechanical linkage 24 and a resistive component (not shown). The resistive component may be the stop component 32 or a cam 40 (shown in FIGS. 3A and 3B). FIGS. 2A-2C also illustrate aspects of calculation of forces and selection of linking mechanism parameters to achieve a desired reverse force.

In these diagrams, $l_1$ is a length in the x-z plane from point P1 to point P0, $l_2$ is a length from point P0 to point P2, and $l_3$ is a length from point P2 to point P3. The pivot member 26 defines an angle $\theta_1$ with respect to the x-axis (or a direction of lateral movement of the end 30), and the linking member 28 defines an angle $\theta_3$ with respect to the x-axis.

As shown in FIG. 2A, when a force $F_1$ (the expansion force) is applied vertically (in the z-direction or parallel to the direction of expansion) to the pressure plate 22, the pivot member 26 rotates about the pivot point P0, causing a force $F_2$ on the linking member 28, which in turn causes the linking member 28 to move in the x-direction and generate a lateral force $F_3$.

As shown in FIG. 2B, the linking member 28 moves a lateral distance d3, and the linking member 28 pushes against a resistive component. The resistive component exerts an opposing lateral force $f_l$.

When the linking mechanism 24 is in a steady state condition, the linking mechanism 24 does not move. The pivot member 26 and the linking member 28 can be considered a rigid body with a fulcrum at point P0, as illustrated in FIG. 2C. In this condition, the linking mechanism 24 exerts a force $F_4$. The force $F_4$ has a normal component $$F_4^N,$$

which represents the reverse force that is applied to the battery cell 14.

In the steady state condition, the total torque is zero and thus can be represented by:

$$l_1F_1 + l_4F_4 = 0,$$

where $l_4$ is a length from point P0 to P3 (FIG. 2C). Accordingly, $$F_4 = -\frac{l_1}{l_4}F_1.$$

The normal component $F_4^N$, i.e., the reverse force can be calculated based on:

$$F_4^N = F_4\cos\theta_3 = -\frac{l_1}{l_4}F_1\cos\theta_3.$$

The length 14 varies as a function of $d_3$ and as a function of the lengths of the pivot member 26 and the linking member 28. Thus, the pressure management system 20 can be calibrated by selecting the lengths to produce a reactive force that has a desired proportion of the expansion force. The system 20 can also be calibrated based on positions of the points P0 and P1, to affect the reverse force.

Figures 3A, 3B:
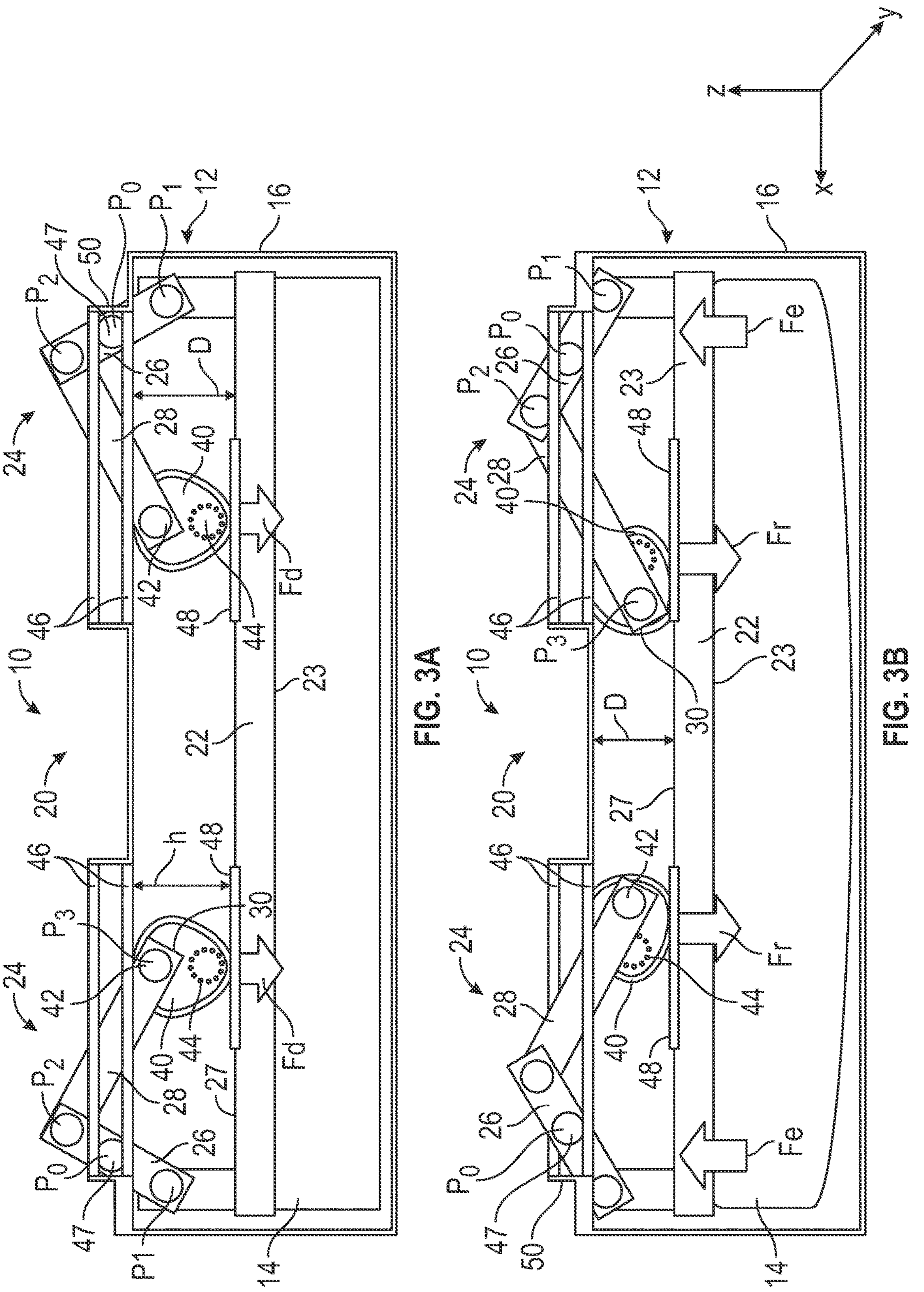
FIGS. 3A and 3B depict an energy storage system including a pressure management system including one or more mechanical linkages, each mechanical linkage connected to a rotatable component, in accordance with an exemplary embodiment.

FIGS. 3A and 3B show an embodiment of the pressure management system 20, which includes a rotatable component connected to each mechanical linkage 24. The rotatable component is configured to rotate in response to lateral movement of the linkage 24, and allow the pressure plate 22 to move and provide additional space for a battery cell 14 to expand. In this way, the pressure management system 20 automatically responds to increases in internal pressure, and thereby provides a volume buffer.

In this embodiment, the rotatable component is a cam 40, which may be any body that can be rotated and maintain engagement with the pressure plate 22 during rotation. The cam 40 has a non-circular shape, such as a pear or teardrop shape as shown in FIGS. 3A and 3B. The shape may be any suitable shape, such that a height h of the cam 40 changes due to rotation of the cam 40.

FIG. 3A shows the pressure management system 20 in an initial state in which the cam 40 of each mechanical linkage 24 is in a first orientation. In the first orientation, the cam 40 defines a distance D between an upper surface 27 of the pressure plate 22 and a top portion of the housing 16, and the pressure plate 22 defines a volume with the housing 16.

FIG. 3B shows the pressure management system 20 in an activated state. The activated state is triggered by the expansion force $F_e$ exceeding the threshold force. In the activated state, the cam 40 has rotated to a second orientation in which the height h is reduced, which allows the pressure plate 22 to move upward and reduce the distance D, and allow for an increase in the volume to allow for expansion of the battery cell 14.

The cam 40 is connected to the end 30 via a pin 42 or other connection mechanism that allows the cam 40 to rotate about the end 30. For example, the pin 42 is located at or near a relatively wide end of the cam 40 as shown.

In an embodiment, the cam 40 has a center of gravity 44 that is eccentrically located to assist in returning the cam 40 to the first orientation when the internal pressure of the battery cell 14 reduces and the expansion force falls below the threshold. The center of gravity 44 may be established, for example, by increasing the thickness of the cam 40 (e.g., along the y-axis) near the narrower end of the cam 40, or including a higher density material or insert near the narrower end.

In an embodiment, the pressure management system 20 also includes a mechanical guide or track 46 that restricts movement of the pivot point P0 to a lateral movement path. The track 46, for example, includes elongated members that can retain a pin 47 or other component at the pivot point P0. The track 46 prevents the pivot point P0 from moving vertically, or otherwise establishes a path so that the pivot member 26 forces the linking member 28 to push the cam 40 laterally and vertically as the cam 40 rotates. In this way, a reverse force is maintained on the battery cell 14 as the battery cell 14 expands and the pressure plate 22 moves upward. The track 46 includes an end component or surface 50 that prevents the pivot point P0 from moving toward a side wall of the housing 16 beyond a desired position.

The pressure management system 20 may include additional features or components to facilitate transitioning between the initial state and the activated state. In an embodiment, the pressure plate 22 includes or is attached to an engagement surface 48 configured to provide sufficient friction so that the cam 40 is prevented from sliding. For example, the engagement surface 48 is a portion of the upper surface 27 having an increased roughness, or is a separate plate or component attached to the surface 27.

In addition, or alternatively, the surface of the cam 40 can have a roughness to provide friction. In another example, the surfaces of the cam 40 and the engagement surface 48 may have features such as grooves or gear teeth that allow the cam 40 to engage the pressure plate and rotate without sliding.

Figure 4:
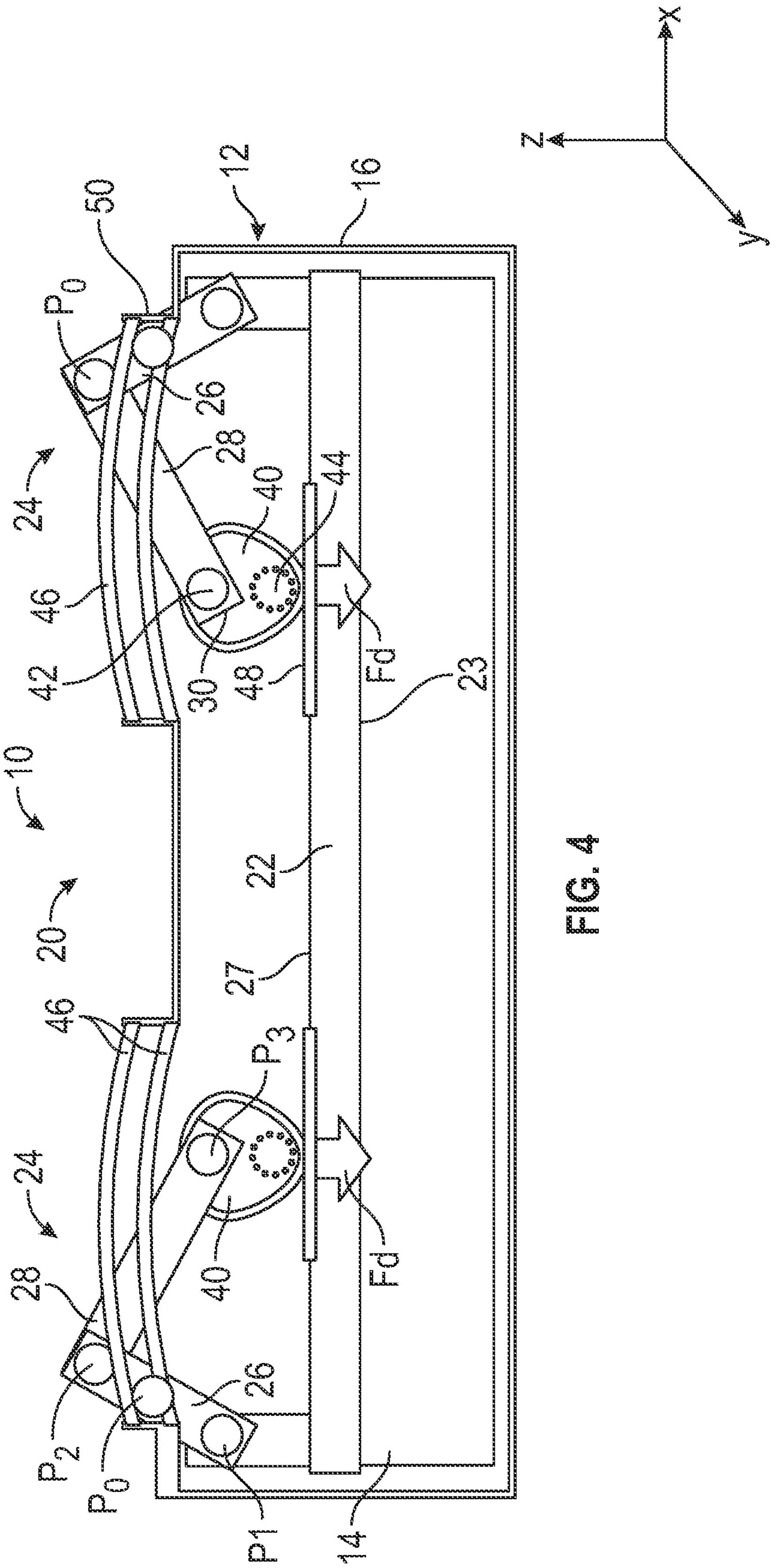
FIG. 4 depicts an energy storage system including a pressure management system including one or more mechanical linkages, each mechanical linkage connected to a rotatable component, in accordance with an exemplary embodiment.

The track 46 may establish a linear or non-linear path. For example, as shown in FIG. 4, the track 46 may be a curved track. The curvature of the track 48 can be selected to cause the end of the linking member 28 to move in a circular or arc-shaped path to facilitate rotation of the cam 40. The curvature may also be selected to affect the magnitude of the reverse force $F_r$ exerted by a linking mechanism 24 as the pressure plate 22 is forced upward by cell expansion.

It is noted that embodiments are not limited to the number and location of the mechanical linkages shown herein. For example, the pressure management system 20 may include one linking mechanism 24 on one side of the pressure plate 22. In addition, there may be more than one linking mechanism 24 arrayed along the y-direction.

In an embodiment, the pressure management system 20 includes a biasing system that provides one or more components configured to control the amount of reverse force $F_r$ (i.e., control a proportion of the expansion force $F_e$ that is redirected toward the cell 14). The biasing system may be a passive or active system that can be designed so as to maintain and/or adjust a desired proportion.

The biasing system may also be configured to control the amount of expansion force (i.e., the threshold force) needed to cause the linking mechanism(s) 24 to transition to the activated state.

Figure 5A:
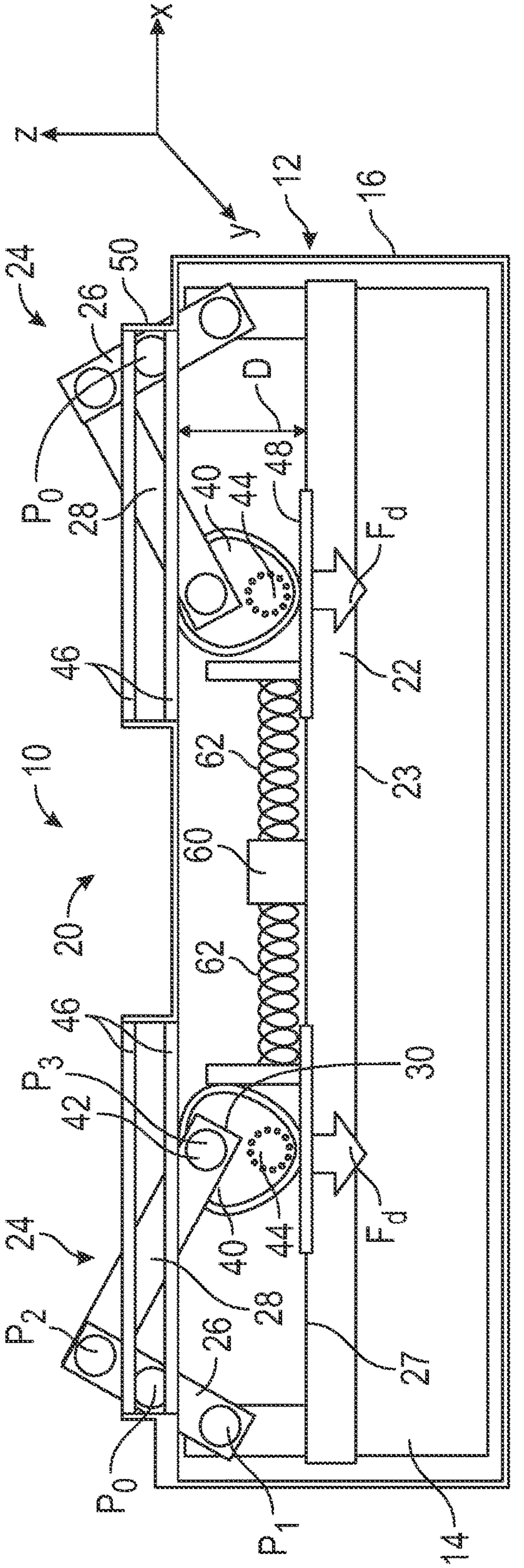
FIGS. 5A and 5B depict an energy storage system including a pressure management system including one or more mechanical linkages and a biasing system including one or more biasing members, in accordance with an exemplary embodiment.
Figure 5B:
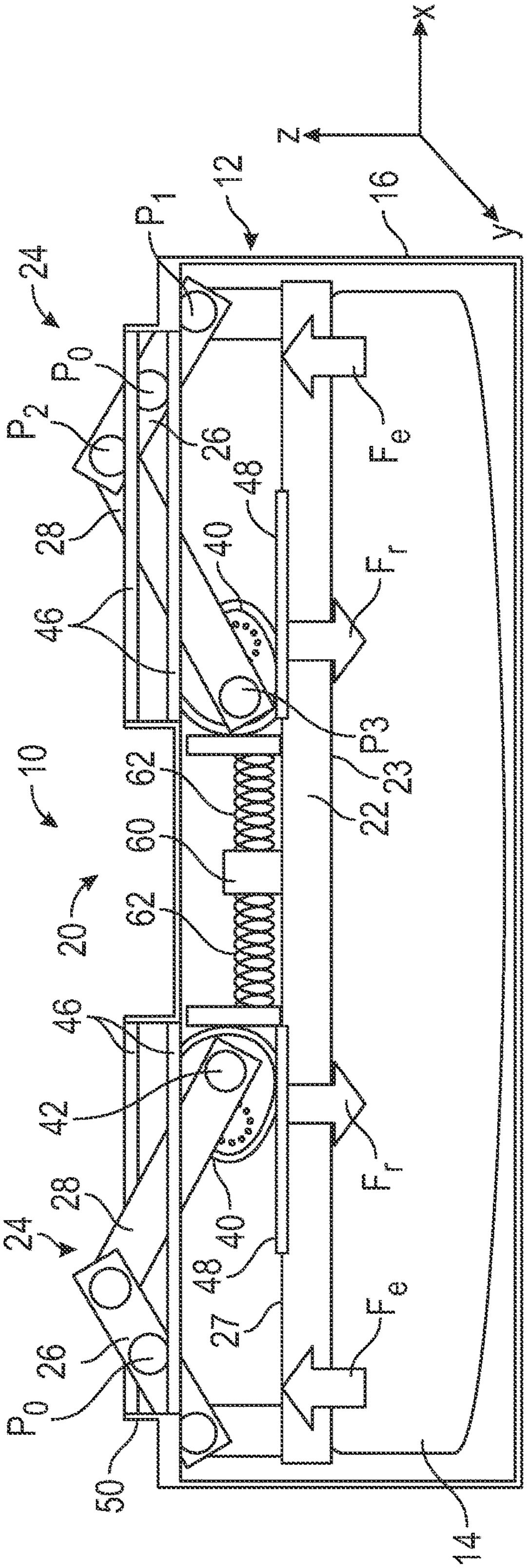

For example, as shown in FIGS. 5A and 5B, the pressure management system 20 includes a stop component 60 that is part of or attached to the pressure plate 22. A laterally extending spring 62 is provided that can couple with a linking mechanism 24 to resist lateral movement of a linking member 28 and resist rotation of the cam 40. Each spring 62 exerts a biasing force that opposes the lateral movement.

FIG. 5A shows the pressure plate 22 in an initial or default position, at which a default force $F_d$ is exerted on the cell 14. Each spring 62 is connected to or attached to the stop component 60 at one end of the spring 62. The other end of the spring 62 is located laterally away from the stop component 60, and is configured to engage with a respective cam 40 and exert a biasing force that resists rotation.

The biasing force is a function of a spring constant k of the spring 62. When the cell 14 expands and applies an expansion force to the pressure plate 22, upward movement of the pressure plate 22 causes each pivot member 24 to rotate about the pivot point P0 and cause the pivot point P0 to move along the track 46, which in turn causes the linking member 28 to move laterally and rotate the cam 40. Rotation of the cam 40 causes the spring 62 to compress as shown in FIG. 5B. By selecting an appropriate spring constant, the amount of lateral force needed to rotate the cam, and the corresponding expansion force threshold, can be selected.

In an embodiment, the pressure management system 20 includes a biasing control system that can be actively controlled at any time to change the relationship between expansion and reverse forces. The biasing control system can also be used to compress or decompress one or both biasing members to adjust the expansion force threshold.

Figure 6:
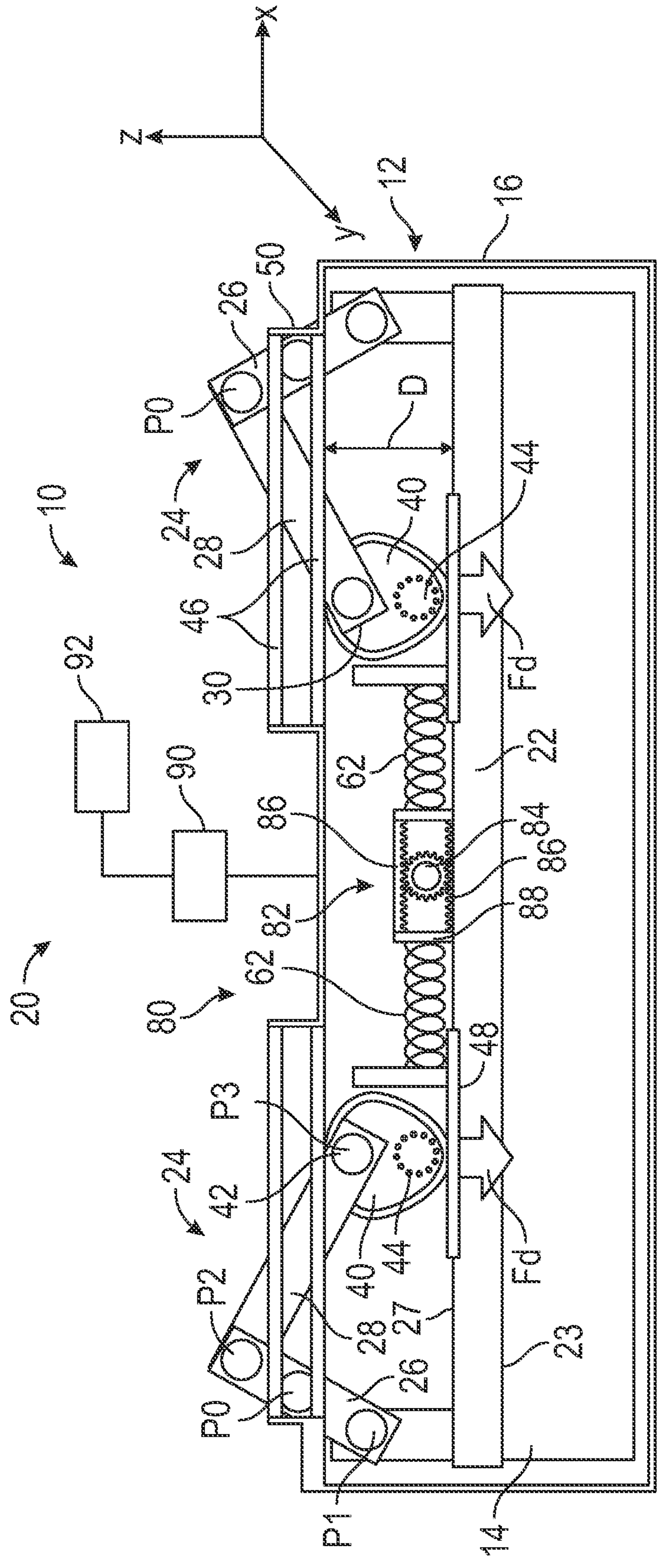
FIG. 6 depicts an energy storage system including a pressure management system including one or more mechanical linkages and a controllable biasing system including one or more biasing members, in accordance with an exemplary embodiment.

FIG. 6 depicts an embodiment of the pressure management system 20 including a biasing member adjustment system 80. The adjustment system 80 includes an adjustment device, referred to as a spring adjuster 82. The spring adjuster 82 is coupled to the springs 62 and is controllable to increase or decrease spring compression, and thereby control the spring force (i.e., the magnitude of the spring force due to a given amount of lateral movement).

In an embodiment, the spring adjuster 82 includes a stationary pinion gear 84 that is coupled to at least one linear gear or rack 86 (or other linear actuator). Each linear gear 86 is attached to or otherwise engageable with a respective spring to adjust the spring force. For example, each linear gear 86 is attached at an end thereof to an interface component 88 (e.g., a plate or disc) that engages a respective spring 62.

The pinion gear is coupled to an actuator 90, such as a low power motor, that is operable to rotate the pinion gear 84 to move the linear gears 86 and compress or decompress the springs 62. The actuator 90 may be manually controlled by an operator, or controlled via a controller 92 or other processing device.

If it is desired to adjust the reverse force $F_r$ (e.g., to maintain a constant pressure as conditions such as temperature change, change the pressure, or change the threshold force), the actuator 90 is controlled to rotate the pinion gear 84 and cause the linear gears 86 to move. The pinion gear 84 may be rotated in a clockwise direction to move the linear gears 86 outwardly and compress the springs 62, which increases the threshold force. To decompress the springs 62 and thereby reduce the threshold force, the pinion gear 84 may be rotated in a clockwise direction.

Embodiments are not limited to the configuration shown in FIG. 6. Embodiments may include multiple spring force adjusters that are controlled synchronously by a single motor. In other embodiments, multiple independent spring force adjusters are provided, in which each spring force adjuster is independently controlled.

Figure 7A:
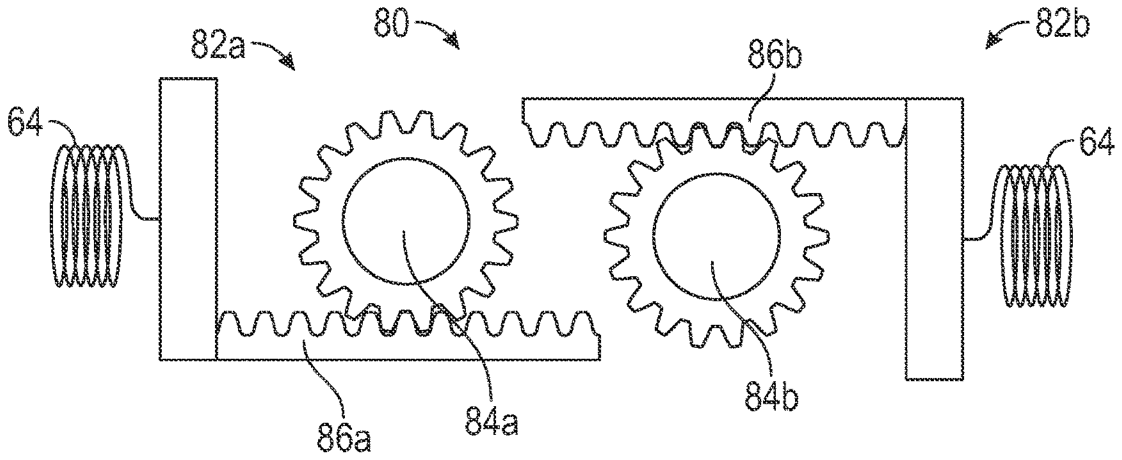
FIGS. 7A and 7B depict an adjustment device of the biasing system of FIG. 6, in accordance with an exemplary embodiment.
Figure 7B:
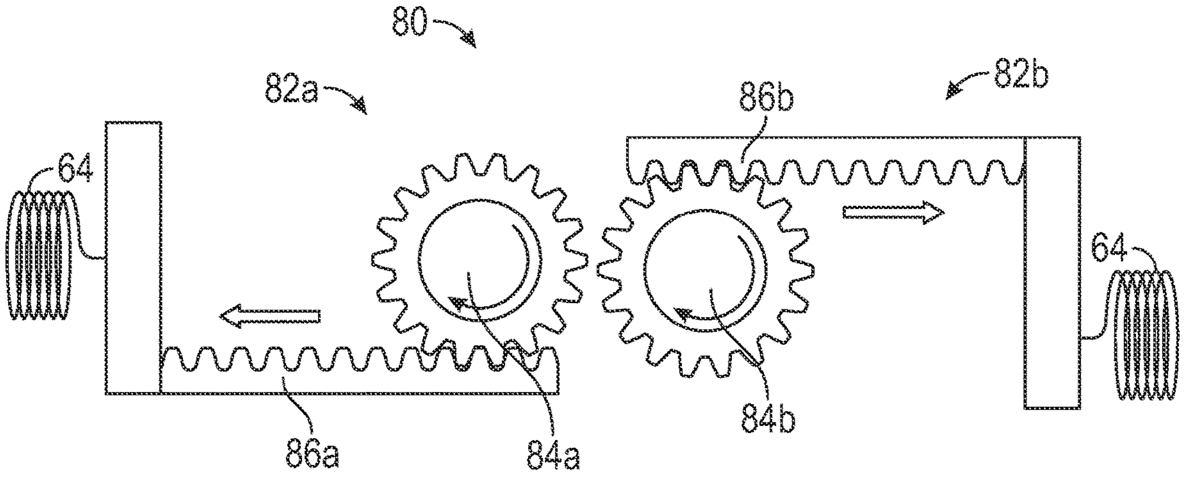

FIGS. 7A and 7B show an example in which the biasing system 80 includes two independently controllable spring adjusters 82*a* and 82*b*. Each spring adjuster is coupled to a different spring or biasing device, and has its own motor. FIG. 7A shows the biasing system in a first state in which compression on the springs 62 is relatively low, and FIG. 7B shows a condition in which the spring adjusters 82*a* and 82*b* are both actuated to compress their respective springs. As each spring adjuster is independently controllable, a different amount of compression can be applied (e.g., the spring adjusters 82*a* and 82*b* are controlled so that one of the springs 62 has a different compression than an opposing spring 62).

Figure 8:
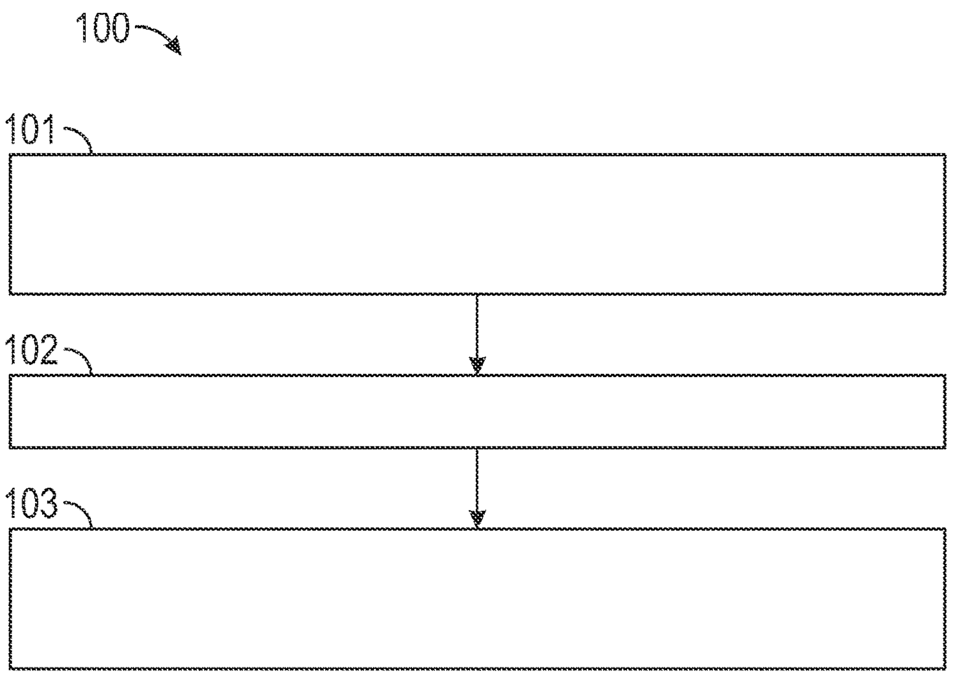
FIG. 8 is a flow diagram describing a method of managing pressure in a battery system, in accordance with an exemplary embodiment.

FIG. 8 illustrates an embodiment of a method 100 of managing pressure of a battery assembly. Aspects of the method 100, such as adjustment of a biasing system, may be performed by a processor or processors.

The method 100 includes a number of steps or stages represented by blocks 101-103. The method 100 is not limited to the number or order of steps therein, as some steps represented by blocks 101-103 may be performed in a different order than that described below, or fewer than all of the steps may be performed.

Aspects of the method 100 are discussed in conjunction with the energy storage device 10 shown in FIG. 1, and the pressure management system 20 as shown in FIGS. 2A and 2B, for illustration purposes. The method 100 is not so limited and can be used with any type of battery cell and any system having linkages that reverse forces as described herein.

At block 101, a battery assembly is assembled or manufactured. The battery assembly may be a battery module, such as the module 12, having one or more battery cells. Such cells may be lithium metal type pouch cells or any other cell that is subject to expansion. Manufacture of the battery assembly includes disposing a pressure management system, such as the pressure management system of FIGS. 3A and 3B.

At block 102, the battery assembly is operated. For example, the battery module 12 is a battery pack of a vehicle, and provides electrical power to an electric motor or motors of the vehicle.

At block 103, as the battery cells expand during operation (or between operations), the pressure management system 20 controls the pressure of a battery cell or cells of the battery assembly. This control includes applying a proportional reverse force in a direction toward the battery cell(s) to compensate for the expansion force and maintain a desired pressure or pressure range. For example, when the battery cells 14 expand, the mechanical linkages 24 and the cams 40 redirect a portion of the expansion force $F_e$ as the reverse force $F_r$.

For example, the pressure plate 22 applies a default or initial reverse force $F_d$ to maintain an initial pressure in the battery cell 14. As the battery cell 14 cycles, a pressure increase causes the expansion force $F_e$ and the pressure management system 20 responds to provide the reverse force $F_r$. When the expansion force $F_e$ reaches a certain threshold, the linking mechanisms 24 move laterally and rotate their respective cams 40, allowing the pressure plate 22 to be forced upward and provide additional volume to accommodate the expansion and reduce the pressure. If a spring adjuster 82 is included, the control includes operating the actuator 90 to adjust the spring force that is applied in response to movement of a linking mechanism 24.

This pressure control provides the extra volume on demand, to avoid negative effects, such as separator breakage, dendrite growth and potential internal short circuits. At the same time, when the expansion force is below the threshold, the pressure control may apply a reverse force to maintain a desired pressure range, which can have positive effects such as preventing dendrite growth.

Figure 9:
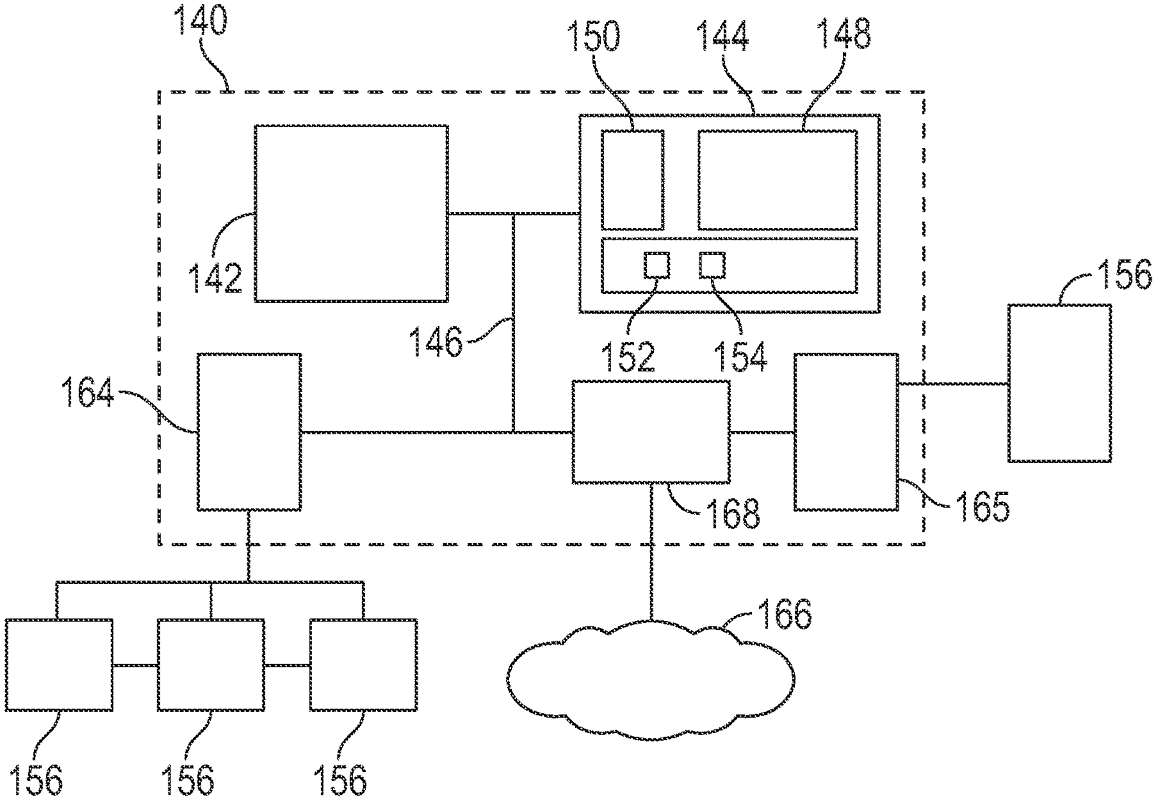
FIG. 9 depicts a computer system in accordance with an exemplary embodiment.

FIG. 9 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module or modules 152 may be included to perform functions related to monitoring battery systems. An image analysis module 154 may be included for controlling aspects of pressure management, such as controlling the actuator of the spring adjuster as described herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this invention belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A pressure management system comprising:

a pressure plate disposed at an initial position relative to a battery cell, the battery cell disposed in a housing, the pressure plate and the housing defining an enclosure, wherein an increase in an internal pressure of the battery cell causes an expansion force to be applied to the pressure plate;

a mechanical linkage attached to the pressure plate, the mechanical linkage configured to translate the expansion force to a reverse force that is opposed to the expansion force; and a rotatable component connected to the mechanical linkage, the rotatable component configured to rotate from a first orientation to a second orientation based on lateral movement of the mechanical linkage to allow the pressure plate to move and increase a volume of the enclosure.

2. The system of claim 1, wherein the mechanical linkage is configured to move laterally and rotate the rotatable component based on the expansion force being greater than a threshold force.

3. The system of claim 2, wherein the rotatable component is a cam connected via a pivot point to an end of the mechanical linkage, the cam having a shape selected to allow the pressure plate to define a first distance when the cam is in the first orientation, and define a second distance when the cam is in the second orientation.

4. The system of claim 3, wherein the cam has an eccentric center of gravity selected so that the cam is configured to return to the first orientation when the expansion force is less than the threshold force.

5. The system of claim 3, wherein the cam is configured to maintain contact with the pressure plate during rotation to apply the reverse force continuously as the battery cell expands.

6. The system of claim 1, wherein the mechanical linkage includes a pivot member having a first end and a second end, the first end attached to the pressure plate at a fixed pivot point, the fixed pivot point having a fixed position relative to the pressure plate.

7. The system of claim 6, wherein the mechanical linkage includes a linking member having a third end and a fourth end, the third end connected to the second end by a second pivot point, the fourth end connected to the rotatable component.

8. The system of claim 7, wherein the pivot member includes a third pivot point between the first end and the second end, the third pivot point configured to move laterally along a guide member.

9. The system of claim 8, wherein the guide member includes a track that causes the third pivot point to move within a lateral path and cause the fourth end to move both laterally and toward the pressure plate, such that the rotatable component applies the reverse force during rotation of the rotatable component.

10. A method of controlling a pressure of a battery cell, comprising:

receiving an expansion force at a pressure plate disposed at an initial position relative to the battery cell, the battery cell disposed in a housing, the pressure plate and the housing defining an enclosure, the expansion force resulting from an increase in an internal pressure of the battery cell; and managing a pressure of the battery cell by a pressure management system including a mechanical linkage attached to the pressure plate, the mechanical linkage connected to a rotatable component, wherein managing the pressure includes:

translating the expansion force to a reverse force based on lateral movement of the mechanical linkage, the reverse force configured to oppose the expansion force; and based on the expansion force exceeding a threshold force, causing the mechanical linkage to move laterally and rotate the rotatable component from a first orientation to a second orientation to allow the pressure plate to move and increase a volume of the enclosure.

11. The method of claim 10, wherein the rotatable component is a cam connected via a pivot point to an end of the mechanical linkage, the cam having a shape selected to allow the pressure plate to define a first distance when the cam is in the first orientation, and define a second distance when the cam is in the second orientation.

12. The method of claim 11, wherein the cam has an eccentric center of gravity selected so that the cam is configured to return to the first orientation when the expansion force is less than the threshold force.

13. The method of claim 11, wherein the cam maintains contact with the pressure plate during rotation to apply the reverse force continuously as the battery cell expands.

14. The method of claim 10, wherein the mechanical linkage includes a pivot member having a first end and a second end, the first end attached to the pressure plate at a fixed pivot point, the fixed pivot point having a fixed position relative to the pressure plate, and the mechanical linkage includes a linking member having a third end and a fourth end, the third end connected to the second end by a second pivot point, the fourth end connected to the rotatable component.

15. The method of claim 14, wherein the pivot member includes a third pivot point between the first end and the second end, the third pivot point configured to move laterally along a guide member.

16. The method of claim 15, wherein the guide member includes a track that causes the third pivot point to move within a lateral path and cause the fourth end to move both laterally and toward the pressure plate, such that the rotatable component applies the reverse force during rotation.

17. A vehicle system comprising:

a battery system connected to an electric motor of a vehicle, the battery system including a battery cell disposed in a housing; and a pressure management system including:

a pressure plate disposed at an initial position relative to a battery cell, the battery cell disposed in a housing, the pressure plate and the housing defining an enclosure, wherein an increase in an internal pressure of the battery cell causes an expansion force to be applied to the pressure plate;

a mechanical linkage attached to the pressure plate, the mechanical linkage configured to translate the expansion force to a reverse force that is opposed to the expansion force; and a rotatable component connected to the mechanical linkage, the rotatable component configured to rotate from a first orientation to a second orientation based on lateral movement of the mechanical linkage to allow the pressure plate to move and increase a volume of the enclosure.

18. The vehicle system of claim 17, wherein the mechanical linkage is configured to move laterally and rotate the rotatable component based on the expansion force being greater than a threshold force.

19. The vehicle system of claim 18, wherein the rotatable component is a cam connected via a pivot point to an end of the mechanical linkage, the cam having a shape selected to allow the pressure plate to define a first distance when the cam is in the first orientation, and define a second distance when the cam is in the second orientation, and wherein the cam is configured to maintain contact with the pressure plate during rotation to apply the reverse force continuously as the battery cell expands.

20. The vehicle system of claim 19, wherein the cam has an eccentric center of gravity selected so that the cam is configured to return to the first orientation when the expansion force is less than the threshold force.

* * * * *